United States Patent
Perie et al.

(10) Patent No.: US 7,975,671 B2
(45) Date of Patent: Jul. 12, 2011

(54) ENGINE SPEED CONTROL DEVICE, A METHOD FOR CONTROLLING ENGINE SPEED AND AN AIRCRAFT PROVIDED THEREWITH

(75) Inventors: Jean-Claude Perie, Grenade (FR); Valerie Roche, Toulouse (FR); Mathieu Dulaur, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 12/091,068

(22) PCT Filed: Oct. 26, 2006

(86) PCT No.: PCT/FR2006/002411
§ 371 (c)(1),
(2), (4) Date: Apr. 22, 2008

(87) PCT Pub. No.: WO2007/048936
PCT Pub. Date: May 3, 2007

(65) Prior Publication Data
US 2009/0126683 A1    May 21, 2009

(30) Foreign Application Priority Data
Oct. 28, 2005    (FR) .................................... 05 11114

(51) Int. Cl.
*F02D 41/00*    (2006.01)
*G06F 19/00*    (2011.01)
*B64C 13/04*    (2006.01)
*G05G 1/00*    (2006.01)

(52) U.S. Cl. .......... 123/352; 701/110; 123/403; 74/491; 244/221

(58) Field of Classification Search ................... 123/350, 123/352, 357, 361, 399, 400, 376, 403; 701/93, 701/101–103, 110, 3, 99, 100; 180/178, 180/179; 74/513, 516, 518, 491; 244/220, 244/221, 228; 440/87
See application file for complete search history.

(56) References Cited

U.S. PATENT DOCUMENTS

| | | | | |
|---|---|---|---|---|
| 4,660,429 A * | 4/1987 | Bregenzer | .................... | 74/105 |
| RE32,413 E * | 5/1987 | Hayashida | ................... | 123/342 |
| 4,947,970 A * | 8/1990 | Miller et al. | ................... | 477/30 |
| 5,080,619 A * | 1/1992 | Uchida et al. | ................... | 440/84 |
| 5,206,805 A * | 4/1993 | Petzold et al. | ................... | 701/67 |
| 5,613,652 A | 3/1997 | Greene | | |
| 5,918,697 A | 7/1999 | Mueller et al. | | |
| 6,338,697 B1 * | 1/2002 | Baudoin et al. | ............... | 477/203 |
| 6,524,223 B2 * | 2/2003 | Graf et al. | ................... | 477/109 |
| 7,377,256 B2 * | 5/2008 | Glora | ............................ | 123/325 |
| 7,377,827 B1 * | 5/2008 | Sturdy et al. | ................... | 440/84 |

FOREIGN PATENT DOCUMENTS

| EP | 0 875 451 | 11/1998 |
|---|---|---|
| GB | 2 114 717 | 8/1983 |

* cited by examiner

*Primary Examiner* — Willis R Wolfe, Jr.
*Assistant Examiner* — Johnny H Hoang
(74) *Attorney, Agent, or Firm* — Oblon, Spivak, McClelland, Maier & Neustadt, L.L.P.

(57) ABSTRACT

An engine speed control device includes an engine speed control lever that generates an engine speed instruction and a device for delivering the indicative information on the actual engine speed. An actuator applies a mechanical force on the lever according to the difference between the instruction and the indicative information on the actual engine speed.

22 Claims, 3 Drawing Sheets

ENGINE SPEED CONTROL DEVICE, A METHOD FOR CONTROLLING ENGINE SPEED AND AN AIRCRAFT PROVIDED THEREWITH

The invention relates to an engine-speed control device, for example for an aircraft, to a method for controlling engine speed and to an aircraft equipped with such a device.

In engine-powered vehicles, and especially in aircraft, there is used an engine-speed control lever that permits the pilot (or driver) to control the vehicle's engine speed during manual operation and thus to control the power developed by the engine and also the speed of the vehicle.

With this objective, the engine-speed control lever delivers, to the engine, information equivalent to an engine-speed setpoint. Upon reception of this setpoint, the internal mechanisms of the engine respond in such a way that the effective engine speed converges toward the setpoint, generally doing so within a response time on the order of one second.

In established manual operation, the effective engine speed therefore follows the setpoint supplied by the control lever quite precisely, in such a way that the said lever generally provides a good indication of the effective speed.

In other situations, however, especially during transition modes, there exists an appreciable deviation between the setpoint indicated by the position of the engine-speed control lever and the effective engine speed. This deviation naturally causes the effective engine speed to change toward the setpoint engine speed given by the control lever as explained in the foregoing, which may lead to an unpleasant jolt for the vehicle's passengers when the deviation is large.

This is the case in particular in vehicles that use an automatic system that regulates the engine speed without corresponding modification of the lever position. During automatic operation, in fact, the engine speed is then entirely controlled by this system, regardless of the position of the engine-speed control lever (for example, the position used before the switch to automatic mode of operation); in this mode of operation, therefore, a relationship between the setpoint generated by the control lever and the effective engine speed does not exist.

Upon exit from the automatic mode of operation, or in other words upon return to the manual mode of operation of engine-speed control, a deviation therefore exists in general between the effective engine speed determined in the preceding instants by the automatic regulating system and the engine-speed setpoint generated by the control lever.

As indicated in the foregoing, this deviation (or difference) causes an untimely change of the engine speed that can be disturbing for the pilot and unpleasant for the passengers, especially in the case of aircraft in which the corresponding thrust change can be relatively violent.

In order to avoid these speed changes, the pilots generally attempt to reposition the engine-speed control lever in a position that corresponds to the effective engine speed upon exit from the automatic mode of regulation. To assist the pilot in this effort, it is common practice to provide, on the same screen, an indication of the effective engine speed and an indication of the setpoint delivered by the control lever being manipulated by the pilot.

However, this solution means that the pilot must observe the screen in question even though he may wish to direct his attention to a different screen that he considers to be more important, as is frequently the case in situations in which the pilot switches to manual mode of operation.

In addition, for this solution to function effectively, the pilot must focus on making the setpoint indication converge toward the effective engine-speed indication on the screen by the effect of his actions on the control lever, which is relatively complex, especially in combination with other actions that the pilot must accomplish at the same time.

The invention is therefore aimed in particular at providing a more practical solution that the pilot can employ for the problem created by an undesired deviation between the engine-speed setpoint delivered by the control lever and the effective engine speed, for example upon deactivation of the automatic engine-speed regulating system.

The invention therefore proposes in particular an engine-speed control device comprising an engine-speed control lever that generates an engine-speed setpoint and means for delivering information indicative of the effective engine speed, characterized by actuating means capable of applying a mechanical force on the lever as a function of the difference between the setpoint and the information indicative of the effective engine speed.

The user of the lever therefore feels a tactile sensation as a function of the proximity of the setpoint delivered by the lever and the effective engine speed.

In this connection, the actuating means deliver, for example, specific tactile information when the difference is zero. The user is then informed when the setpoint is equal to the effective engine speed.

When the device comprises an automatic engine-speed regulating system, the actuating means are active upon deactivation of the automatic regulating system, for example. Deactivation of the automatic regulating system is in fact an instant at which the search for coincidence between the setpoint and the effective engine speed is particularly opportune.

In this same context, the information indicative of the effective engine speed is, for example, an engine-speed calculated by the automatic regulating system. This information is easily available.

The actuating means can then apply zero force when the automatic regulating system is active.

Alternatively, the actuating means can be active throughout the entire duration of the automatic mode of regulation. The pilot will then be able to search for coincidence between the setpoint and the effective engine speed prior to deactivation of automatic regulation, thus avoiding any sudden change in thrust at the instant of deactivation.

In this case, the actuating means can be inactivated upon deactivation of the automatic regulating system.

According to a first conceivable embodiment, the actuating means comprise a movable stop capable of cooperating with the control lever and means for shifting the movable stop as a function of the information indicative of the effective engine speed.

The movable stop can be retractable.

According to a second conceivable embodiment, the actuating means comprise an electromechanical brake capable of cooperating with the control lever.

In this case, it is possible to provide that the electromechanical brake applies a maximum resisting force to the control level when the setpoint is equal to the information indicative of the effective engine speed.

According to a third conceivable embodiment, the actuating means comprise a motor capable of acting on the lever and motor engine control electronics.

It is then possible to provide that the control electronics control the motor in such a way that the latter generates a torque as a function of the difference between the setpoint and the information indicative of the effective engine speed.

For example, the motor generates a non-zero torque when the said difference is non-zero and smaller than a predetermined angle, and the motor generates zero torque when the said difference is zero.

The invention also proposes an aircraft comprising an engine-speed control device such as mentioned hereinabove.

The invention additionally proposes a method for controlling engine speed, comprising the following steps:
- determination of an engine speed calculated by means of an automatic engine-speed regulating system;
- application, by actuating means, of a mechanical force on a handle that delivers an engine-speed setpoint, the mechanical force being a function of the difference between the setpoint and the calculated engine speed.

According to a conceivable solution, the application step is executed upon deactivation of the automatic regulating system.

Alternatively, the application step is executed throughout the duration of the automatic mode of regulation.

The method may also include a step of deactivation of the actuating means after a predetermined time interval.

Other characteristics and advantages of the present invention will be more clearly apparent in light of the description hereinafter, written with reference to the attached drawings, wherein:

FIG. 1 represents an airplane engine-speed control system that implements a first embodiment of the invention.

Figure 1:
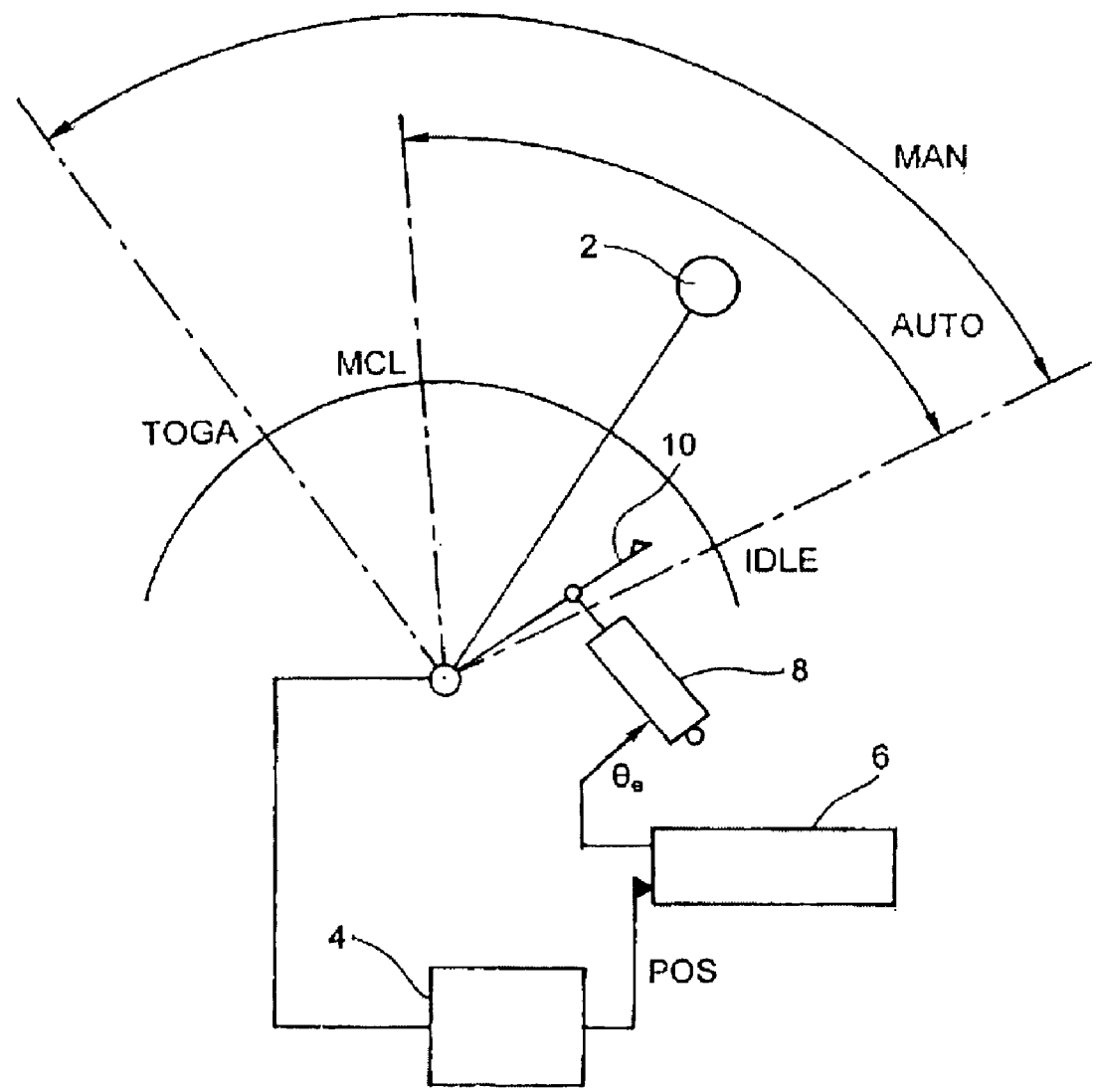
FIG. 1 represents an engine-speed control system according to a first embodiment of the invention.

This engine-speed control system comprises a control lever 2 that is rotationally movable around an axis perpendicular to the plane of FIG. 1.

Control lever 2 is made in the form of a handle, generally referred to as "throttle lever" by the pilots.

The different positions that the lever or handle 2 can occupy are represented on an arc of a circle:
- a slow-running position, denoted "IDLE" in FIG. 1;
- a climbing position, denoted "MCL" (English acronym for "maximum climb") in FIG. 1;
- a range of positions that handle 2 can occupy in manual mode, extending between the IDLE and TOGA positions and represented by the label "MAN" in FIG. 1;
- a range of positions that handle 2 can occupy in automatic mode of regulation of the engine speed, denoted "AUTO" in FIG. 1 and extending between the IDLE and MCL positions, automatic regulation taking place between the speed represented by the position of the handle and the idle position;
- a takeoff position, denoted "TOGA" (English acronym for "take-off go-around") in FIG. 1.

Certain hard points, generally incorporated into the rotational mechanism of handle 2, may be provided at each specific position such as the IDLE, MCL and TOGA positions.

The position of handle 2 is measured by a position sensor 4, which transmits, to an engine-speed controller 6, information POS relating to the angular position of handle 2.

In manual mode, the position of handle 2 represents the engine speed desired by the pilot. The position information POS is therefore converted to an engine-speed setpoint by controller 6 during manual mode (or in other words when handle 2 is not in AUTO position, as will be seen hereinafter).

In manual mode of operation, controller 6 controls the engine mechanisms of the airplane in such a way that its engine speed converges toward the engine speed derived from the position of handle 2.

When the automatic mode of regulation of the engine speed is engaged (generally by means of a button in the cockpit of the airplane and provided handle 2 is in the AUTO range of positions described hereinabove), controller 6 determines the engine speed as a function of diverse parameters available to it, and not directly from the setpoint generated by the device as a function of the position of handle 2. For this purpose, controller 6 comprises a calculator, which determines the optimal engine speed (calculated engine speed) as a function of the measured values of certain parameters (such as airplane speeds) and of values desired for these same parameters and furnished, for example, by the automatic piloting program.

Exit from the automatic mode of regulation of the engine speed takes place by a pilot action specific for this purpose (for example, on a button situated in the cockpit) or when the pilot shifts the handle outside the AUTO range of positions permitted for automatic regulation.

At this instant (and possibly, according to a conceivable alternative, also prior thereto during automatic mode, in order to avoid any delay of positioning of the stop), controller 6 controls an actuator 8 in such a way that a movable retractable stop 10 is placed in the AUTO range of deflection of handle 2 at the angular position corresponding to the effective engine speed, or in other words at the last engine speed determined by automatic regulation.

To achieve this, controller 6 determines the angular position $\theta_e$ that corresponds to the last engine speed demanded by the automatic engine-speed regulating system. Controller 6 uses a conversion rule inverse to that which permits it to transform the position information POS to an engine-speed setpoint during manual operation.

Actuator 8 then positions retractable stop 10 at the position $\theta_e$ demanded by controller 6.

Thus, when the pilot seeks to make the engine-speed setpoint delivered by handle 2 correspond to the effective engine speed (meaning the engine speed during exit from automatic mode), handle 2 becomes stopped against retractable stop 10 precisely when the sought position is reached.

In this way the pilot is informed immediately by a tactile sensation in handle 2 that the position of correspondence of the setpoint and of the effective engine speed has been reached.

It is nevertheless provided that stop 10 can be displaced by handle 2 when a large force (such as 5 daN and greater) is exerted thereon, in order that the presence of stop 10 does not jeopardize the pilot's ability to move handle 2 over the entire range of manual control.

In addition, stop 10 is retracted after a time delay (such as 10 seconds), so that it does not disturb the normal operation of handle 2, especially in established mode.

Figure 2:
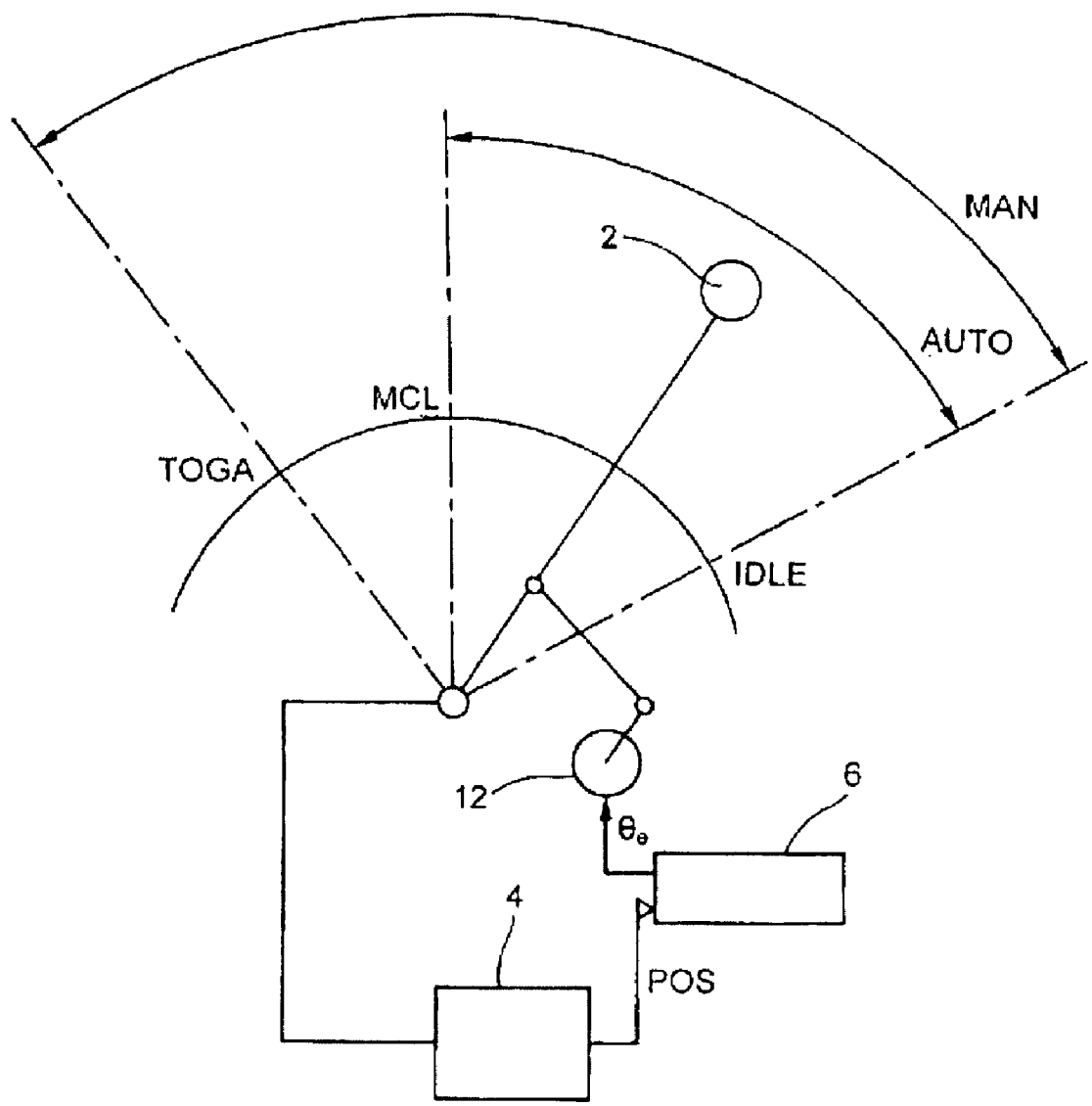
FIG. 2 represents an engine-speed control system according to a second embodiment of the invention.

FIG. 2 represents an engine-speed control device designed according to a second embodiment of the invention.

The elements common to this embodiment and to that described hereinabove with reference to FIG. 1 are denoted by the same numerical references and will not be described again.

As in the foregoing, position sensor 4 sends information POS about the position of handle 2 to controller 6. It is recalled that the information POS makes it possible, during manual operation, to deduce the engine-speed setpoint from the position of handle 2.

In automatic mode of regulation of the engine speed, the latter is calculated by the automatic regulation system, as already explained.

Upon exit from the automatic mode of regulation of the engine speed, or in other words when the pilot deactivates automatic regulation or shifts handle 2 outside the AUTO range of positions, controller 6 brings about activation of an electromechanical brake 12 connected to handle 2.

Specifically, controller 6 sends, to electromechanical brake 12, information about angular position $\theta_e$ indicative of the effective engine speed upon exit from the automatic mode of regulation, or in other words of the speed that corresponds in this case to the last engine speed calculated by the automatic engine-speed regulation system.

Electromechanical brake 12 is active in angular position $\theta 0_e$ received from controller 6, or alternatively around that angular position, preferably in this case with maximum action for angular position $\theta_e$.

In this way, when the position of handle 2 reaches the angle corresponding to the effective engine speed (or in other words, when the setpoint delivered by handle 2 corresponds to the effective engine speed), electromechanical brake 12 creates a resisting torque on handle 2, which in turn gives the pilot a "hard point" sensation characteristic of a well-defined position of the handle, in this case the position of coincidence between the setpoint and the effective engine speed.

After a given time delay, or in other words after a certain time lag following the return to manual operation, electromechanical brake 12 is deactivated so as to permit normal displacement along the entire manual control range MAN, possibly with hard points for only the characteristic points IDLE, MCL and TOGA as already mentioned with reference to FIG. 1.

In the embodiment just described, the electromechanical brake is actuated for a predetermined period upon exit from the automatic mode of regulation, thus making it possible to limit the duration of its operating periods.

Alternatively, it can be provided (as already mentioned in the first embodiment and moreover applicable to the three embodiments described here) that the actuating means (in this case the electromechanical brake) are active throughout the entire duration of the automatic mode of regulation, thus making it possible in particular to assist the pilot in his search for the position corresponding to the effective engine speed prior to deactivation of automatic regulation. This position can then be easily reached at the moment of deactivation, thus avoiding any sudden change of thrust.

According to this alternative, it therefore is possible to provide, if necessary, that the actuating means will be inactivated upon deactivation of the automatic mode of regulation.

Figure 3:
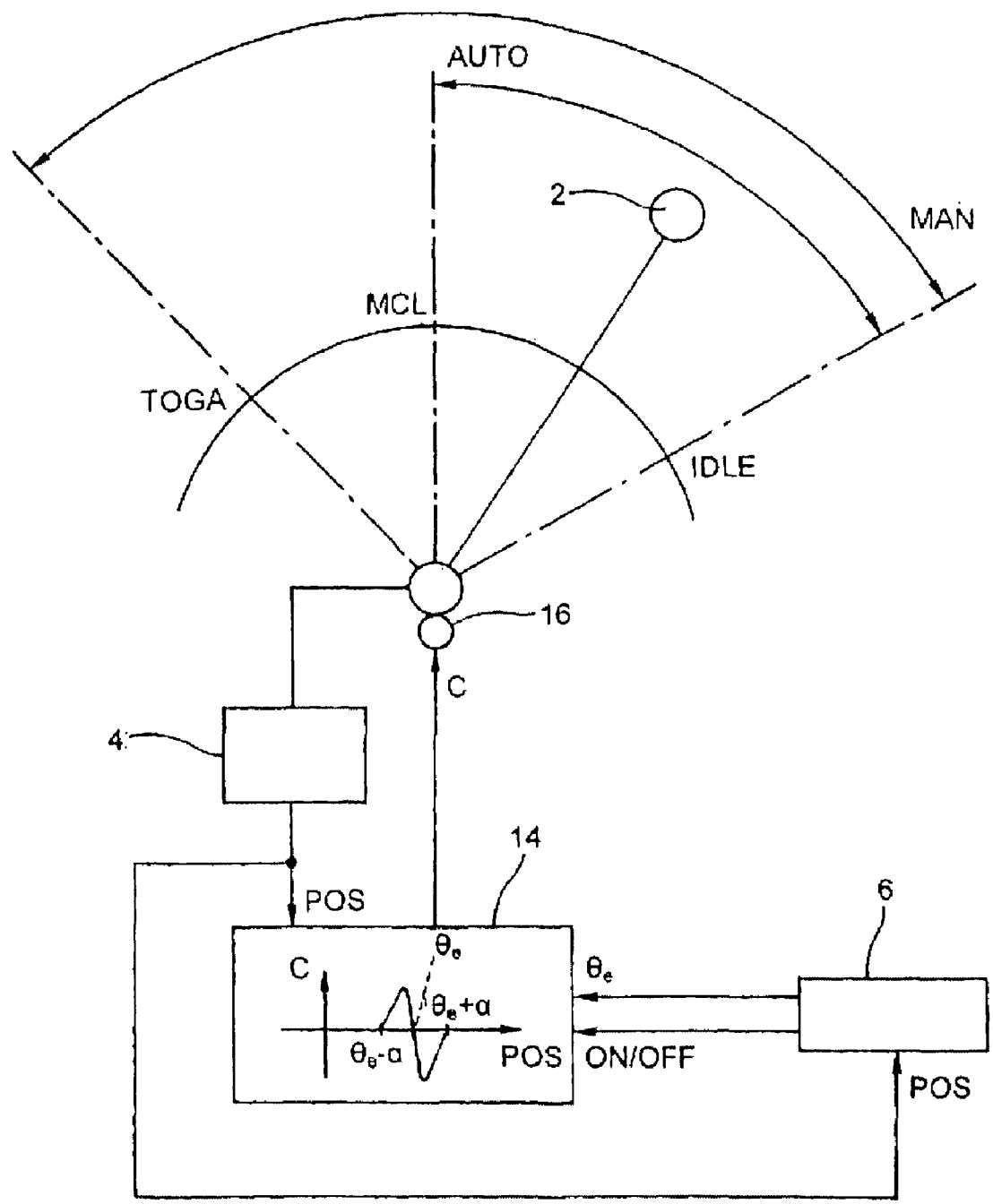
FIG. 3 represents an engine-speed control system according to a third embodiment of the invention.

FIG. 3 represents a third embodiment of the invention.

The elements common to this new embodiment and to the preceding embodiments are denoted by the same numerical references and will not be described again.

The engine-speed control device according to the third embodiment comprises a motor 16 capable of acting on handle 2 during the movements around its axis of rotation.

The motor is controlled by control electronics 14 as a function of information received from engine-speed controller 6, and especially of information about angular position $\theta_e$ and of ON/OFF activation information, as described in detail hereinafter.

In established manual mode, the OFF deactivation information is transmitted from controller 6 to control electronics 14, in such a way that motor 16 is inactive. The rotational forces applied to handle 2 are therefore limited mainly to the forces applied by the pilot, outside of possible mechanical hard points for the specific positions of the type IDLE, MCL and TOGA, as already indicated.

The position of handle 2 given by the pilot and measured by position sensor 4 is transmitted to controller 6 in the form of information POS and converted to an engine-speed setpoint.

When the automatic mode of regulation of the engine speed is used, the engine speed is determined by a calculator integrated in engine-speed controller 6 as a function of diverse parameters, and no longer as a function of the setpoint derived by the position of handle 2.

Throughout the entire duration of operation by automatic regulation of the engine speed, controller 6 maintains the OFF deactivation information intended for control electronics 14 in such a way that motor 16 remains inactive throughout this entire duration. This is consistent with the use of a fixed handle during automatic regulation (or in other words a handle whose position does not change as a function of the regulated engine speed, although it could be modified if necessary by pilot action), since, according to this concept, handle 2 is generally immobilized throughout the entire duration of automatic regulation of the engine speed.

Nevertheless, as has been explained in the foregoing, upon exit from the automatic mode of regulation, the setpoint that is then derived from the new position of handle 2 (by the manual operation described hereinabove) does not correspond in general to the effective engine speed at the instant of deactivation of automatic regulation. In order to prevent the change of engine speed caused by this deviation, the pilot generally seeks to make the position of handle 2 (and thus the generated new setpoint) correspond to the effective engine speed.

To assist the pilot in this endeavor, controller 6 activates control electronics 14 by transmitting the ON information. Controller 6 also transmits information about angular position $\theta_e$ that corresponds to the last engine speed calculated by the automatic regulating system and is indicative of the effective engine speed.

Control electronics 14 then control motor 16 as a function of the position of handle 2 measured by position sensor 4 in such a way as to give the pilot a tactile sensation when the position of handle 2 corresponds to the effective engine speed (indicated by the information about angular position $\theta_e$).

To accomplish this, control electronics 14 act, for example, according to a function of the type schematically represented in FIG. 3. According to this example, motor 16 is active only for angular positions of handle 2 that differ from angular position $\theta_e$ corresponding to the effective engine speed only by an angle smaller than a predetermined angle $\alpha$.

This example additionally provides that, when the position of handle 2 is smaller than angle $\theta_e$ (meaning that it is therefore between $\theta_e-\alpha$ and $\theta_e$), motor 16 exerts on handle 2 a positive torque (corresponding, for example, to a force of between 2 N and 8 N), which therefore tends to displace the handle toward position $\theta_e$.

In symmetric manner, when the position of handle 2 is greater than $\theta_e$ (meaning that it is therefore between the angles $\theta_e$ and $\theta_e+\alpha$), control electronics 14 instruct motor 16 to exert on handle 2 a negative torque (for example, on the same order of magnitude in absolute value as the positive torque), which therefore tends to return handle 2 toward the position $\theta_e$.

The example that has just been described therefore makes it possible to urge handle 2 toward a stable position at the angle $\theta_e$ by action of motor 16 when the pilot brings handle 2 to within an angle a of this same position $\theta_e$.

By way of illustration, $\alpha$ can be taken between 1° and 10°; for example $\alpha=2°$.

It is noted that motor 16 and associated control electronics 14 are used here not to bring about displacement of handle 2 over the entire range of manual control but instead to generate a specific force profile that permits the pilot to find, more easily, the position of correspondence between the new setpoint generated by the position of handle 2 and the effective engine speed upon exit from the automatic mode of operation.

After a predetermined time delay, controller 6 deactivates control electronics 14 (and therefore motor 16), by transmitting the OFF deactivation information to the control electronics. The previously described, established manual mode of operation is then restored.

The invention is not limited to the embodiments that have just been described. In particular, actuating means other than those presented hereinabove may be used. For example, they may comprise a device that generates vibrations in the handle (or control lever) when the setpoint given by the handle corresponds to the effective speed, or in other words when the difference between the setpoint and the information indicative of the effective speed is zero.

The invention claimed is:

1. A method for controlling engine speed, comprising the following steps:
   determining an engine speed calculated by an automatic engine-speed regulating system;
   applying, with an actuator, a mechanical force on a lever to rotationally move said lever that delivers an engine-speed setpoint as a function of the lever's angular position, the mechanical force being a function of the difference between the setpoint and the calculated engine speed.

2. The control method according to claim 1, wherein the step of applying is executed throughout the duration of the automatic mode of regulation.

3. The control method according to claim 1, wherein the mechanical force tends to hold the lever in an angular position where the difference is zero.

4. The control method according to claim 1, wherein the step of applying is executed upon deactivation of the automatic regulating system.

5. The control method according to claim 4, further comprising a step of deactivating the actuator after a predetermined time interval.

6. An engine-speed control device comprising:
   an engine-speed control lever that is rotationally movable and that generates an engine-speed setpoint as a function of the engine-speed control lever's angular position;
   means for delivering information indicative of effective engine speed; and
   actuating means for applying a mechanical force on the engine-speed control lever as a function of a difference between the setpoint and the information indicative of the effective engine speed.

7. The device according to claim 6, wherein the actuating means deliver specific tactile information to a user of the engine-speed control lever when the difference is zero.

8. An aircraft comprising an engine-speed control device according to claim 6.

9. The device according to claim 6, wherein the mechanical force tends to hold the engine-speed control lever in an angular position where the difference is zero.

10. The device according to claim 6, wherein the actuating means includes
    a movable stop that cooperates with the engine-speed control lever, and
    means for shifting the movable stop as a function of the information indicative of the effective engine speed.

11. The device according to claim 10, wherein the movable stop is retractable.

12. The device according to claim 6, wherein the actuating means include an electromechanical brake that cooperates with the engine-speed control lever.

13. The device according to claim 12, wherein the electromechanical brake applies a maximum resisting force to the engine-speed control level when the setpoint is equal to the information indicative of the effective engine speed.

14. The device according to claim 6, wherein the actuating means include a motor that acts on the engine-speed control lever and motor engine control electronics.

15. The device according to claim 14, wherein the control electronics control the motor that generates a torque as a function of a difference between the setpoint and the information indicative of the effective engine speed.

16. The device according to claim 15, wherein the motor generates a non-zero torque when said difference is non-zero and smaller than a predetermined angle, and wherein the motor generates zero torque when said difference is zero.

17. The device according to claim 6, further comprising an automatic engine-speed regulating system.

18. The device according to claim 17, wherein the information indicative of the effective engine speed is an engine-speed calculated by the automatic regulating system.

19. The device according to claim 17, wherein the actuating means are active upon deactivation of the automatic regulating system.

20. The device according to claim 19, wherein the actuating means apply zero force when the automatic regulating system is active.

21. The device according to claim 17, wherein the actuating means are active throughout the duration of the automatic mode of regulation.

22. The device according to claim 21, wherein the actuating means are inactivated upon deactivation of the automatic regulating system.

* * * * *